United States Patent
Magherini et al.

(10) Patent No.: US 12,071,883 B2
(45) Date of Patent: Aug. 27, 2024

(54) EXHAUST GAS SYSTEM FOR A MOTORCYCLE

(71) Applicant: PIAGGIO & C. S.P.A, Pontedera (IT)

(72) Inventors: Adriano Magherini, Pontedera (IT); Giovanni Fabris, Pontedera (IT)

(73) Assignee: PIAGGIO & C. S.P.A, Pontedera (IT)

( * ) Notice: Subject to any disclaimer, the term of this patent is extended or adjusted under 35 U.S.C. 154(b) by 0 days.

(21) Appl. No.: 18/253,488

(22) PCT Filed: Nov. 23, 2020

(86) PCT No.: PCT/EP2020/083071
§ 371 (c)(1),
(2) Date: May 18, 2023

(87) PCT Pub. No.: WO2022/106037
PCT Pub. Date: May 27, 2022

(65) Prior Publication Data
US 2024/0003277 A1   Jan. 4, 2024

(51) Int. Cl.
*F01N 3/20* (2006.01)
*F01N 3/28* (2006.01)
*F01N 13/00* (2010.01)

(52) U.S. Cl.
CPC .............. *F01N 3/20* (2013.01); *F01N 3/28* (2013.01); *F01N 13/011* (2014.06)

(58) Field of Classification Search
CPC . F01N 3/20; F01N 3/28; F01N 3/2892; F01N 3/0878; F01N 3/24; F01N 13/011;
(Continued)

(56) References Cited

U.S. PATENT DOCUMENTS 5,849,250 A * 12/1998 Timko ................. F01N 13/14
60/287
7,055,311 B2 * 6/2006 Beutel ............... B01D 53/9495
60/287
(Continued)

FOREIGN PATENT DOCUMENTS

EP       1900917 A2    3/2008
WO    2018083650 A1    5/2018

OTHER PUBLICATIONS

International Search Report and Written Opinion issued in PCT application No. PCT/EP2020/083071, dated Jun. 17, 2021.

*Primary Examiner* — Dapinder Singh
(74) *Attorney, Agent, or Firm* — BENESCH, FRIEDLANDER, COPLAN & ARONOFF LLP

(57) ABSTRACT

Exhaust gas system (1) for an internal combustion engine (2) of a saddle-ride type vehicle (20), comprising: —a first conduit portion (3) with one or more primary catalysts (6) arranged inside thereof; —a second conduit portion (4) with one or more secondary catalysts (6') arranged inside thereof; —a third conduit portion (5) inside of which there is arranged a number of secondary catalysts (6') which is less than the number of secondary catalysts arranged inside said second conduit portion (4); —at least one outlet (16,17) for discharging exhaust gas to atmosphere; wherein said first conduit portion (3) extends from a first end (11) connectable to an outlet of said internal combustion engine (2) and branches at a branch point (19) into said second and third conduit portions (4,5); wherein said exhaust gas system (1) further comprises at least one valve (7) configured to deviate an exhaust gas flow coming from the engine (2) from the first conduit portion (3) into one or both of said the second and third conduit portions (4,5).

19 Claims, 2 Drawing Sheets

(58) Field of Classification Search
CPC ............... F01N 13/009; F01N 13/0093; F01N 13/1805; F01N 13/18; F01N 13/04; F01N 13/02; F01N 13/00; F01N 2240/20; F01N 2240/00; F01N 2230/04; F01N 2230/00; F01N 2410/00; F01N 2410/02; F01N 2410/03; F01N 2410/04; F01N 2410/06; F01N 2590/04; Y02T 10/12; Y02T 10/40
See application file for complete search history.

(56) References Cited

U.S. PATENT DOCUMENTS

| | | | |
|---|---|---|---|
| 7,802,424 B2 | 9/2010 | Kanzawa et al. | |
| 8,833,061 B2 * | 9/2014 | Winkler | F01N 13/04 60/297 |
| 8,978,613 B2 * | 3/2015 | Will | F01M 5/02 123/196 R |
| 10,480,369 B1 * | 11/2019 | Dahodwala | F01N 3/106 |
| 11,572,815 B2 * | 2/2023 | Martz | F01N 3/208 |
| 2006/0000205 A1 | 1/2006 | Bozmoski et al. | |
| 2009/0308060 A1 * | 12/2009 | Suzuki | F01N 3/0233 60/311 |
| 2020/0032691 A1 | 1/2020 | Miura | |

* cited by examiner

EXHAUST GAS SYSTEM FOR A MOTORCYCLE

FIELD OF THE APPLICATION

The present invention belongs to the field of internal-combustion engines. In particular, the present invention belongs to the field of internal-combustion engines of saddle-ride type vehicles. In more details, the present invention relates to an exhaust gas system for an internal combustion engine of a vehicle of the kind mentioned above.

BACKGROUND ART

According to the most common and recent legal regulations in terms of environment protection, both the noise as produced by internal combustion engines and the amount of polluting substances contained in the exhaust gases as produced by said engines and entered into the environment have to be kept under very strict limits and values.

For the purpose of matching the above mentioned legal limits, solutions have been proposed by the manufacturers of internal combustion engines wherein, according to the most common solutions, use is made of one or more catalysts disposed along the exhaust gas system, in particular inside one or more of the exhaust gas pipes or conduits of same, and wherein polluting substances as contained in the exhaust gases produced by the combustion are trapped before said exhaust gases being discharged into the environment.

An example of an exhaust gas system according to the prior art is known from US patent application 2020/0056519 arising from PCT application PCT/IB2017/0566881 filed on Nov. 3, 2017 in the name of the same applicant of the present application.

The exhaust gas system according to US 2020/0056519 revealed to be satisfactory as to the amount of the polluting substances as trapped by the catalysts; however, said exhaust gas system is affected by drawbacks which the Applicant of present application aims to overcome or at least to reduce by means of the present invention.

It has in fact to be considered that the above mentioned legal limits may differ from region to region or even from area to area of a same region or country wherein for example the above mentioned limits are stricter in urban areas than in extra urban areas.

Moreover, it has to be considered as well that the catalysts impact on the performances of the engine wherein for example increasing the number and/or dimensions of the catalysts results in the performances of the engines being reduced, in particular in terms of generated power, thus in terms of speed and/or acceleration of the vehicle.

Exhaust gas systems according to the prior art do not allow to tune the performances of the catalysts with those of the engine so that, for example, with a set of very performant catalysts a lack of power arises in situation in which more power would be convenient (for instance in extra urban areas) and wherein, on the other hand, the use of a less performant set of catalysts (with a reduced impact on the engine performances) does not allow the vehicle to be used in urban areas.

DISCLOSURE OF THE INVENTION

The main purpose of the present invention is therefore that of overcoming the drawbacks affecting exhaust gas systems according to the prior art.

In particular, a further goal of the present invention is that of providing an exhaust gas system comprising a set of catalysts and allowing to tune the performances of said set of catalysts (and therefore the impact of same on the performances of the engine) as a function of the contingent situation.

A further goal of the present application is that of providing an exhaust gas system allowing to reduce the impact of the set of catalysts on the performances of the engine when the engine (and thus the vehicle) is used in areas where more engine power is needed and less strict anti pollution regulations are pending and/or current, and to increase again the catalysts performances when the engine (and thus the vehicle) is used in areas where stricter anti-pollution regulations are current.

Further goals of the present invention relate to the provision of an exhaust gas system adapted to be manufactured and installed on a plurality of different vehicles according to simple and quick operations, and therefore at reduced or at least contained costs.

The present invention arises from the consideration that the above summarized goals can be achieved (thus overcoming the drawbacks affecting the prior art exhaust gas systems) by means of an exhaust gas system allowing to deviate the exhaust gases along at least two different flow paths offering corresponding different catalyst performances, for instance why comprising corresponding different numbers of catalysts and/or catalysts of different kind and/or dimensions.

In view of the above consideration, and taking into account both the drawbacks affecting prior art exhaust gas systems and the above summarized goals and/or purposes, according to the present invention there are provided an exhaust gas system as claimed in claim 1 and a motorcycle as claimed in claim 15, further embodiments of the system and motorcycle according to the present invention being defined by the dependent claims.

Disclosed in the present application is an exhaust gas system, in particular for an internal combustion engine of a saddle-ride type vehicle, said system comprising:
- a first conduit portion with one or more primary catalysts arranged inside thereof;
- a second conduit portion with one or more secondary catalysts arranged inside thereof;
- a third conduit portion inside of which there is arranged a number of catalysts which is less than the number of catalysts arranged inside said second conduit;
- at least one outlet for discharging exhaust gas to atmosphere;

wherein said first conduit portion extends from a first end connectable to an outlet of said internal combustion engine and branches at a branch point into said second and third conduit portions;

wherein said exhaust gas system further comprises at least one valve configured to deviate an exhaust gas flow coming from the engine from the first conduit portion into one or both of said second and third conduit portions.

According to an embodiment, two of said primary catalysts are arranged inside said first conduit, for improving the abatement of pollutants.

According to an embodiment, two of said secondary catalysts are arranged inside said second conduit, for further improving the abatement of pollutants.

According to an embodiment, said at least one valve is a three-ways valve arranged at said branch point where said first conduit portion branches into said second conduit portion and third conduit portion, for choosing the setting of the exhaust system.

According to an embodiment, said three-ways valve is configured to be switched between a first operative position in which said valve entirely deviates said exhaust gas flow from said first conduit portion into said second conduit portion, and a second operative position in which said valve deviates said exhaust gas flow from said first conduit portion in part into said second conduit portion and in part into said third conduit portion. In this way, two preferable settings of the exhaust gas system are provided.

According to an embodiment, said valve is configured to be further switched in a third operative position in which said valve entirely deviates said exhaust gas flow from said first conduit portion into said third conduit portion. In this way, better engine performances can be achieved.

According to an embodiment, said at least one valve is a butterfly valve arranged along said second conduit portion and configured to be switched between a plurality of operating positions, for selecting the most convenient setting of the exhaust gas system.

According to an embodiment, said at least one valve is a butterfly valve arranged along said third conduit portion and configured to be switched between a plurality of operating positions, for selecting the most convenient setting of the exhaust gas system.

According to an embodiment, said second conduit portion further comprises a first muffler portion, for reducing the generated noise.

According to an embodiment, said third conduit portion further comprises a second muffler portion, for further reducing the generated noise.

According to an embodiment, said first and second muffler portions are encased in a common casing or in respective casings, for improving the exhaust gas system form an aesthetical point of view.

According to an embodiment, said at least one outlet of said exhaust gas system is a distal end of said second conduit portion or a distal end of said third conduit portion, wherein said second and third conduit portions are fluidly connected to each other, for obtaining a maximized reduction of noises.

According to an embodiment, said at least one outlet of said exhaust gas system comprises two outlets corresponding to the distal ends of said second and third conduit portions, respectively. In this way, the two conduit portions behaviour as two independent exhaust gas systems.

According to an embodiment, wherein said second conduit portion has a cross section which is narrower than the cross section of said third conduit portion or vice versa, for tuning the percentage of gas flow going in the second portion and thus the reduction of pollutants.

According to an embodiment, the number of catalysts arranged inside the third conduit portion is zero, for using only the catalyst arranged upstream to the third conduit portion.

Further disclosed in the present application is a motorcycle comprising an internal combustion engine comprising an outlet, and an exhaust gas system according to an embodiment as disclosed, wherein the exhaust gas system is connected to said outlet for discharging an exhaust gas flow coming from said internal combustion engine.

According to an embodiment, said motorcycle further comprises one or more of the following sensors:
 a speed sensor configured to measure a speed of said motorcycle;
 a throttle position sensor configured to measure an angular position of a throttle valve;
 an engine speed sensor configured to measure a number of revolutions of a crankshaft of said engine;
said motorcycle further comprising a control unit operatively connected to said valve of said exhaust gas system and to one or more of said sensors. In this way, the valve of the exhaust gas system is controlled based on engine performance parameters, in particular based on parameters permitting to discriminate between a low performance regime and a high performance regime.

According to an embodiment, said control unit is configured to command the switching of said valve from one operating position to another operating position as a function of one or more values measured by said sensors.

According to an embodiment, said control unit is configured to command the switching of the valve from a single path operative position to a double path operative position when a first speed threshold and/or a first angular position of the throttle valve and/or a first number of revolutions of the crankshaft is reached and vice versa;
 said single path operative position being an operative position of said valve in which the exhaust gas flows only in the first and second conduit portions or only in first and third conduit portions; and
 said double path operative position being an operative position of the valve in which the exhaust gas flows from the first conduit portion in part to the second conduit portion and in part to the third conduit portion.

In this way, the performance of the vehicle can be set and ameliorated.

The present invention is further clarified by means of the following detailed description of the embodiments thereof depicted in the drawings. It is however pointed out that the scope of the present invention is not limited to the embodiments described in the following and depicted in the drawings; to the contrary, the scope of the present invention is defined by the appended claims.

BRIEF DESCRIPTION OF THE DRAWINGS

In the drawings:

Schematically depicted in FIG. 1 are an engine and an exhaust gas system according to an embodiment;

Figure 2:
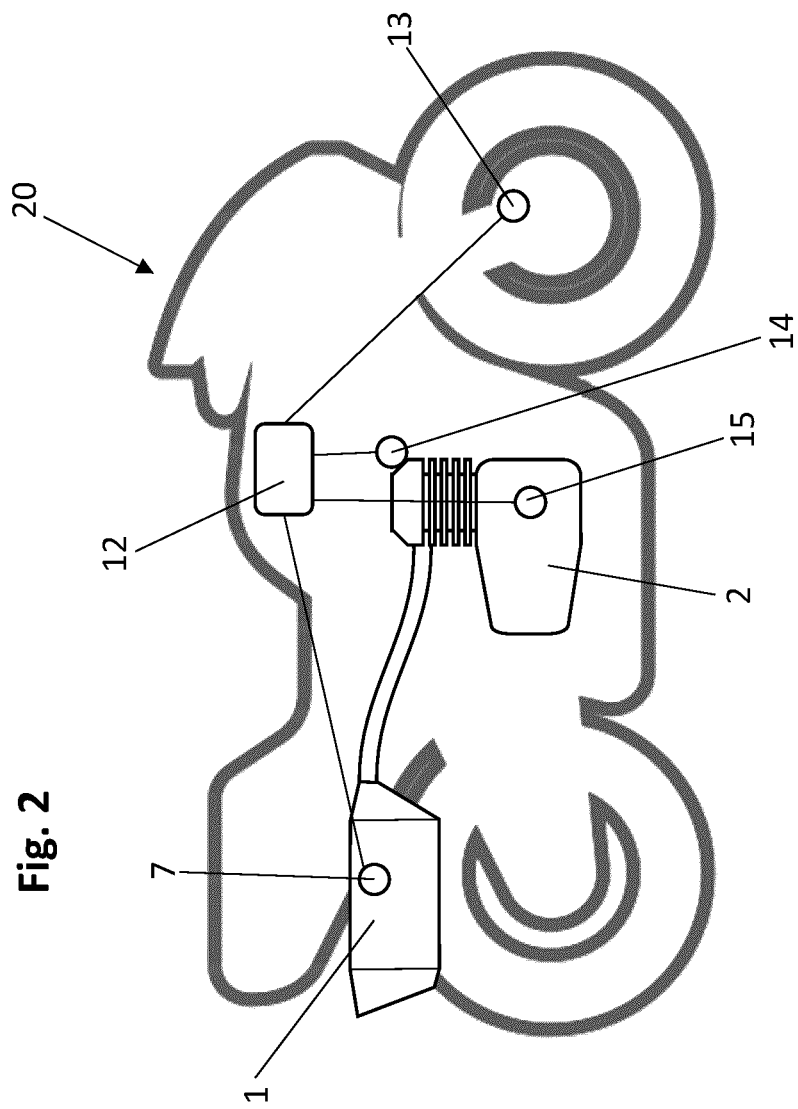

Schematically depicted in FIG. 1A are second conduit portions of an exhaust gas system according to an embodiment;

Schematically depicted in FIG. 1B are first conduit portions of an exhaust gas system according to an embodiment;

Schematically depicted in FIG. 1C are branch portions of the conduits portions of an exhaust gas system according to further embodiments;

Schematically depicted in FIG. 1D are branch portions of the conduits portions of an exhaust gas system according to further embodiments;

Schematically depicted in FIG. 1E are branch portions of the conduits portions of an exhaust gas system according to further embodiments;

Schematically depicted in FIG. 1F are third conduit portions of an exhaust gas system according to an embodiment;

Schematically depicted in FIG. 1G are distal end portions of an exhaust gas system according to further embodiments;

Schematically depicted in FIG. 2 is a motorcycle adapted to be equipped with an exhaust gas system according to the present invention.

DESCRIPTION OF THE PRESENT INVENTION

The exhaust gas system according to the present invention revealed to be particularly advantageous and convenient when applied to saddle-ride type vehicles such as motor-cycles, motorbikes, scooters or the like, having one or two front steering wheels, this being the reason why, in the following, the exhaust gas system according to the present invention will be eventually disclosed with particular reference to vehicles of the kind mentioned above. It is however pointed out that the applications of the exhaust gas system according to the present invention are not limited to the vehicles as mentioned above; to the contrary, internal-combustion engines of any kind can be equipped with the exhaust gas system according to the present invention.

Figure 1:
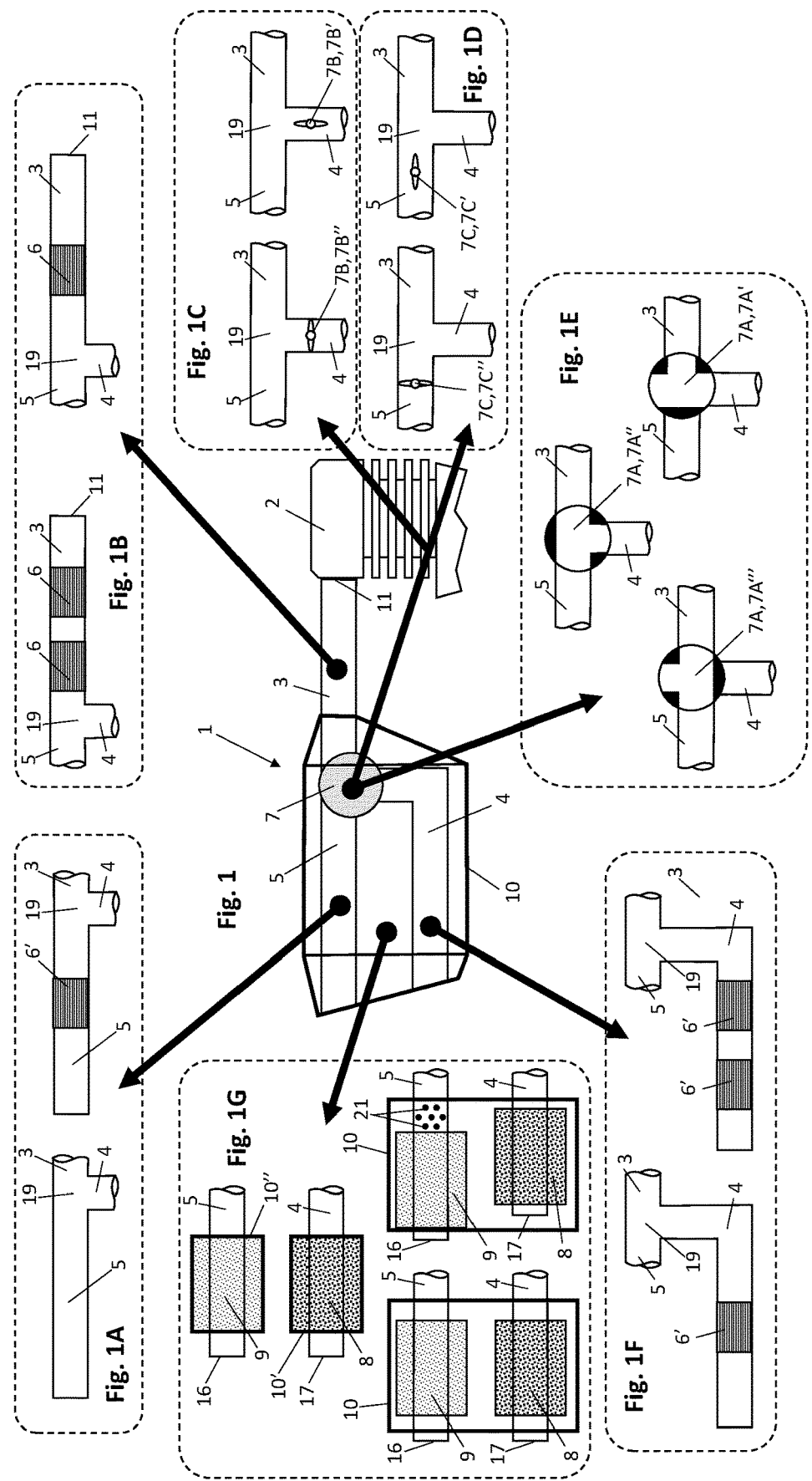

In FIG. 1, the exhaust gas system according to the embodiment of the present invention as depicted therein comprises a first (or main) conduit 3 with an end 11 adapted as depicted to be connected to the exhaust gas outlet of an engine 2; the way according to which the end 17 of first conduit portion 3 is connected to an outlet of the engine 2 does not fall within the scope of the present invention, a detailed description thereof being therefore omitted for the sake of conciseness.

Still as depicted, the first conduit portion 3 branches at branch point 19 (see FIGS. 1A and 1B) into a second conduit portion 4 and a third conduit portion 5, meaning that said second conduit portion 4 and third conduit portion 5 extend from the first conduit portion 3 at branch point 19 wherein, still as depicted (FIG. 1F), the second conduit portion 4 and the third conduit portion 5 define an outlet 17 and an outlet 16, respectively, wherein exhaust gases coming from the first conduit portion 3 and flowing inside the second conduit portion 4 and third conduit portion 5 are discharged therefrom through outlet 17 and outlet 16, respectively.

With reference to FIGS. 1A, 1B and 1F, it can be appreciated that catalysts 6, 6' are arranged in one or more of said first conduit portion 3, second conduit portion 4 and third conduit portion 5. According to the embodiment as depicted in FIGS. 1A, 1B and 1F, one or two primary catalysts 6 are arranged inside the first conduit portion 3, one or more secondary catalysts 6' are arranged inside the second conduit portion 4, one or zero secondary catalyst 6' is arranged inside the third conduit portion 5. Secondary catalyst means a catalyst arranged downstream to a primary catalyst, thus a catalyst that catalyses a gas flows that has been already catalysed by at a primary catalyst.

It has however to be noted that each of the number, kind and dimensions or the like of the catalysts 6, 6' arranged within the first conduit portion 3, the second conduit portion 4 and the third conduit portion 5 can be selected according to the needs and/or circumstances. For the purposes of the present invention and for reason clarified in the following, according to at least a preferred embodiment of the exhaust gas system according to the present invention, the number of catalysts 6' arranged inside the third conduit portion 5 is less than the number of catalysts 6' arranged inside the second conduit portion 4. It means that, according to said at least one embodiment, no catalysts 6' can be arranged inside the third conduit portion 5 if one catalyst 6' is arranged inside the second conduit portion 4. Alternative, it means that, according to at least one additional embodiment, one catalyst 6' is arranged inside the third conduit portion 5 when the second conduit portion 4 comprises two catalysts 6'. In the same way, and still by way of not limiting example, n–1 catalysts 6' can be arranged inside the third conduit portion 5 with n catalysts 6', respectively, arranged inside the second conduit portion 4.

As anticipated, the catalysts of an exhaust gas system impact on the performances of the engine 2 so that situations may arise in which, due to the catalysts, too less or not enough power is generated by the engine.

However, and still as anticipated, the exhaust gas system 1 according to the present invention allows the path followed by the exhaust gases from the inlet 11 to the outlets 17 and/or 16 to be selected (even automatically, see the description below), thus allowing to select the number of catalysts to be used (through which the gases are forced to flow), thus allowing to vary the available amount of engine power.

To this end, according to the present invention, deviating means are provided for the purpose of deviating the flow of exhaust gases inside the exhaust gas system 1.

In particular, according to the embodiment of the present invention as depicted in FIG. 1E, said deviating means comprise a three-way valve 7A, disposed inside the exhaust gas system 1, namely at the branch point 19 of the first conduit portion 3. Said valve 7A can be switched between three different operating positions. In a first operating position 7A', the valve 7A closes the third conduit portion 5 and opens the second conduit portion 4, meaning that the entire flow of gases coming from the first conduit portion 3 is deviated into the second conduit portion 4 and discharged through the outlet 17. In a second operating position 7A", the valve 7A opens both the third conduit portion 5 and the second conduit portion 4, meaning that the flow of exhaust gases coming from the first conduit portion 3 is deviated in part into the third conduit portion 5 and in part into the second conduit portion 4 and discharged either through both the outlet 17 and the outlet 16 or solely through the outlet 16 (see the following description). In a third operating position 7A'", the valve 7A closes the second conduit portion 4 and opens the third conduit portion 5, meaning that the flow of gases coming from the first conduit portion 3 is entirely deviated into the third conduit portion 5 and discharged through the outlet 16.

According to a further embodiment of the present invention as depicted in FIG. 1C, said deviating means comprise at least one butterfly valve 7B arranged inside the second conduit portion 4, namely downstream with respect to the branch point 19. Said butterfly valve 7B can be switched between an open first operating position 7B' and a closed second operating position 7B". With the butterfly valve 7B in the open position 7B' the exhaust gases coming from the first conduit portion 3 flow in part into the third conduit portion 5 and in part into the second conduit portion 4. With the valve 7B in the closed position 7B" the exhaust gases coming from the first conduit portion 3 can flow solely into the third conduit portion 5.

According to a further embodiment of the present invention as depicted in FIG. 1D, said deviating means comprise at least one butterfly valve 7C arranged inside the third conduit portion 5, namely downstream with respect to the branch point 19. Said butterfly valve 7C can be switched between an open first operating position 7C' and a closed second operating position 7C". With the butterfly valve 7C in the open position 7C' the exhaust gases coming from the first conduit portion 3 flow in part into the third conduit portion 5 and in part into the second conduit portion 4. With the valve 7C in the closed position 7C" the exhaust gases coming from the first conduit portion 3 can flow solely into the second conduit portion 4.

It is pointed out, for the sake of clarity, that according to the present invention, use can be made of one or both of the butterfly valve 7B and 7C, and that use of one or both of the butterfly valves 7B and 7C can be made both in alternative and in addition to the three-ways valve 7A.

It arises therefore from the above that switching one or both the butterfly valves 7B and 7C between the respective open and closed positions and/or switching the three-ways valve 7A between its respective three operating positions allow to select through which of the second conduit portion 4 and third conduit portion 5, and therefore through which one or more catalysts 6,6', if any, the exhaust gases may flow.

Further details of the exhaust gas system according to the present invention can be retrieved from FIG. 1G. As depicted therein one or both of the second conduit portion 4 and the third conduit portion 5 can be provided with a first muffler 8 and a second muffler 9, respectively, wherein the end portion (close to the outlet 17) of the second conduit portion 4 extends through the first muffler 8, and wherein the end portion (close to the outlet 16) of the third conduit portion 5 extends through the second muffler 9.

Still as depicted, a first casing 10' and/or a second casing 10" can be provided (both the first casing 10' and the second casing 10" being depicted in FIG. 1G), wherein the first muffler 8 is encased (disposed) in said first casing 10' and/or said second muffler 9 is encased (disposed) in said second casing 10".

As an alternative, a common casing 10 can be provided, wherein in this case both said first muffler 8 and second muffler 9 are encased (disposed) in said common casing 10.

Moreover, in case the common casing 10 is provided a first solution is envisaged according to which both the end portion or distal end of the third conduit portion 5 and the end portion or distal end of the second conduit portion 4 extend across a wall of the common casing 10, meaning that both the outlet 16 of the third conduit portion 5 and the outlet 17 of the second conduit portion 4 end directly in the atmosphere and outside the common casing 10.

Still in case a common casing 10 is provided, an alternative solution is envisaged according to which either the end portion or distal end of the third conduit portion 5 (as depicted) or the end portion or distal end of the second conduit portion 4 extends across a wall of the common casing 10, meaning that in this case either the outlet 16 of the third conduit portion 5 or the outlet 17 of the second conduit portion 4 ends directly in the atmosphere and outside said common casing 10.

In this last case, either the third conduit portion 5 (as depicted) or the second conduit portion 4 can be provided with a plurality of through holes 21, preferably upstream of the muffler 9 or the muffler 8, respectively, so that either the gases discharged through the outlet 17 of the second conduit portion 4 enter into the third conduit portion 5 through the holes 21 (and are finally discharged through the outlet 16 of the third conduit portion), or the gases discharged through the outlet 16 of the third conduit portion 5 enter into the second conduit portion 4 through the holes 21 (and are finally discharged through the outlet 17 of the second conduit portion).

Reference is made in the following to FIG. 2 wherein a motorcycle is identified by the reference numeral 20. As depicted, the motorcycle 20 is equipped with a speed sensor 13 configured to measure a speed of said motorcycle, a throttle position sensor 14 configured to measure an angular position of a throttle valve, and an engine speed sensor 15 configured to measure a number of revolutions of a crankshaft of said engine. The motorcycle 20 further comprises a control unit 12 operatively connected to each of said speed sensor 13, throttle position sensor 14 and engine speed sensor 15 so that the instant values of motorcycle speed, the instant position of said throttle valve and the instant engine speed as collected by said sensors 13, 14 and 15, respectively, are transmitted or forwarded to said control unit 12. Moreover, the control unit 12 is connected as well with one or more of said three-ways valve 7A, butterfly valve 7B and butterfly valve 7C, so that one or more of said three-ways valve 7A, butterfly valve 7B and butterfly valve 7C is switched between its respective operating positions upon receipt of an impulse as emitted by said control unit 12.

It arises therefore from the above that the most convenient path for the exhaust gas flow is selected automatically depending on the contingent conditions and/or needs. Assuming in fact, by way of not limiting example, that the motorcycle 2 is driven in an extra-urban area where more engine power is needed and less strict anti-pollution rules are pending, an exhaust gas flow with a reduced number of catalysts 6, 6' is automatically selected, wherein for instance the second conduit portion 4 is closed and gases flow solely inside the third conduit portion 5 with less or no catalysts 6'.

To the contrary, assuming by way of not limiting example, that the motorcycle 2 is driven in an urban area where less engine power is needed and stricter anti-pollution rules are pending, an exhaust gas flow with an increased number of catalysts 6, 6' is automatically selected, wherein for instance both the second conduit portion 4 and the third conduit portion 5 are open and exhaust gases flow inside both the third conduit portion 5 (with less or no catalysts 6') and the second conduit portion 4 (with at least one catalyst 6').

It has therefore to be demonstrated by means of the above descriptions of the embodiments of the present invention as depicted in the drawings that the present invention allows to overcome or at least reduce the drawbacks affecting exhaust gas systems according to the prior art.

In particular, by means of the present invention an exhaust gas system is provided which:
- allows to tune the performances of the set of catalysts (and therefore the impact of same on the performances of the engine) as a function of the contingent situation; allows to reduce the impact of the set of catalysts on the performances of the engine when the engine (and thus the vehicle) is used in areas where more engine power is needed and less strict anti-pollution regulations are pending and/or current, and to increase again the catalysts performances when the engine (and thus the vehicle) is used in areas where stricter anti-pollution regulations are current;
- can be manufactured and installed on a plurality of different vehicles according to simple and quick operations, and therefore at reduced or at least contained costs.

Although the present invention has been clarified by means of the above description of the embodiments thereof as depicted in the drawings, the present invention is not limited to the embodiments described above and depicted in the drawings.

In this respect, it is pointed out that the embodiments described above and depicted in the drawings are not to be understood as representing different alternatives. To the contrary, each of the embodiments as disclosed is adapted to be implemented in combination with one or more of the further embodiments.

The scope of the present invention is therefore defined by the claims.

The invention claimed is:

1. An exhaust gas system for an internal combustion engine of a saddle-ride vehicle, comprising:
   a first conduit portion with one or more primary catalysts arranged inside thereof;
   a second conduit portion with one or more secondary catalysts arranged inside thereof;
   a third conduit portion inside of which there is arranged a number of secondary catalysts which is less than the number of secondary catalysts arranged inside said second conduit portion;
   at least one outlet for discharging exhaust gas to atmosphere;
   wherein said first conduit portion extends from a first end connectable to an outlet of said internal combustion engine and branches at a branch point into said second and third conduit portions;
   wherein said exhaust gas system further comprises at least one valve configured to deviate an exhaust gas flow coming from the engine from the first conduit portion into one or both of said the second and third conduit portions.

2. The exhaust gas system according to claim 1, wherein no catalysts are arranged inside said third conduit portion.

3. The exhaust gas system according to claim 1, wherein two of said primary catalysts are arranged inside said first conduit.

4. The exhaust gas system according to claim 1, wherein two of said secondary catalysts are arranged inside said second conduit.

5. The exhaust gas system according to claim 1, wherein said at least one valve is a three-ways valve arranged at said branch point where said first conduit portion branches into said second conduit portion and third conduit portion.

6. The exhaust gas system according to claim 5, wherein said three-ways valve is configured to be switched between a first operative position in which said valve entirely deviates said exhaust gas flow from said first conduit portion into said second conduit portion, and a second operative position in which said valve deviates said exhaust gas flow from said first conduit portion in part into said second conduit portion and in part into said third conduit portion.

7. The exhaust gas system according to claim 6, wherein said valve is configured to be further switched in a third operative position in which said valve entirely deviates said exhaust gas flow from said first conduit portion into said third conduit portion.

8. The exhaust gas system according to claim 1, wherein said at least one valve is a butterfly valve arranged along said second conduit portion and configured to be switched between a plurality of operating positions.

9. The exhaust gas system according to claim 1, wherein said at least one valve is a butterfly valve arranged along said third conduit portion and configured to be switched between a plurality of operating positions.

10. The exhaust gas system according to claim 1, wherein said second conduit portion further comprises a first muffler portion.

11. The exhaust gas system according to claim 10, wherein said third conduit portion further comprises a second muffler portion.

12. The exhaust gas system according to claim 11, wherein said first and second muffler portions are encased in a common casing, or in respective casings.

13. The exhaust gas system according to claim 1, wherein said at least one outlet of said exhaust gas system is a distal end of said second conduit portion or a distal end of said third conduit portion and wherein said second and third conduit portions are fluidly connected to each other.

14. The exhaust gas system according to claim 1, wherein said at least one outlet of said exhaust gas system comprises two outlets corresponding to the distal ends of said second and third conduit portions respectively.

15. The exhaust gas system according to claim 1, wherein said second conduit portion has a cross section which is narrower than the cross section of said third conduit portion or vice versa.

16. A motorcycle comprising an internal combustion engine comprising an outlet, and an exhaust gas system according to claim 1, wherein the exhaust gas system is connected to said outlet for discharging an exhaust gas flow coming from said internal combustion engine.

17. The motorcycle according to claim 16, further comprising one or more of the following sensors:
   a speed sensor configured to measure a speed of said motorcycle;
   a throttle position sensor configured to measure an angular position of a throttle valve;
   an engine speed sensor configured to measure a number of revolutions of a crankshaft of said engine;
said motorcycle further comprising a control unit operatively connected to said valve of said exhaust gas system and to one or more of said sensors.

18. The motorcycle according to claim 17, wherein said control unit is configured to command the switching of said valve from one operating position to another operating position as a function of one or more values measured by said sensors.

19. The motorcycle according to claim 17, wherein said control unit is configured to command the switching of the valve from a single path operative position to a double path operative position when a first speed threshold and/or a first angular position of the throttle valve and/or a first number of revolutions of the crankshaft is reached and vice versa;
   said single path operative position being an operative position of said valve in which the exhaust gas flows only in the first and second conduit portions or only in first and third conduit portions; and
   said double path operative position being an operative position of the valve in which the exhaust gas flows from the first conduit portion in part to the second conduit portion and in part to the third conduit portion.

* * * * *